United States Patent [19]

Ducote

[11] Patent Number: 4,913,753
[45] Date of Patent: Apr. 3, 1990

[54] TMXDI, CURING AGENT FOR HYDROXY TERMINATED PROPELLANT BINDERS

[75] Inventor: Marjorie E. Ducote, Huntsville, Ala.

[73] Assignee: The United States of America as represented by the Secretary of the Army, Washington, D.C.

[21] Appl. No.: 411,768

[22] Filed: Sep. 25, 1989

[51] Int. Cl.[4] .......................................... C06F 95/10
[52] U.S. Cl. .................................. 149/19.9; 149/42; 149/44; 149/76
[58] Field of Search ...................... 149/19.9, 76, 42, 44

[56] References Cited

U.S. PATENT DOCUMENTS

| 4,019,933 | 4/1977 | Cuksee et al. | 149/19.9 |
|---|---|---|---|
| 4,042,619 | 8/1977 | Miegel | 149/19.9 |
| 4,090,893 | 5/1978 | Cocksee et al. | 149/19.9 |
| 4,410,470 | 10/1983 | Sayles | 149/19.9 |
| 4,597,811 | 7/1986 | Ducote | 149/19.9 |
| 4,655,858 | 4/1987 | Sayles | 149/19.9 |

OTHER PUBLICATIONS

"M—36and P-TMXDI: Two New Isocyanates for the Polyurethane Industry", by Volker D. Arendt, Raymond E. Logan, and Robert Saxon, Journal of Cellular Plastics, Nov./Dec. 1982.

Primary Examiner—Stephen J. Lechert, Jr.
Attorney, Agent, or Firm—Freddie M. Bush; James T. Deaton

[57] ABSTRACT

The compound m-tetramethylxylene diisocyanate (m-TMXDI), is a domestically, commercially produced aliphatic diisocyanate process produced by a non-phosgenation process for the polyurethane industry with suggested applications in reaction injection molding, surface coatings, and in soft polyurethanes with specialty applications (e.g. as solar cell encapsulants). Applicant's discovery relates to the use of m-TMXDI in an amount from about 0.5 to about 2.0 weight percent for curing a composite rocket propellant composition comprising other ingredients in weight percentages of a high solids loading of aluminum metal fuel (0-20%) and ammonium perchlorate oxidizer (65-88%), hydroxy-terminated polymer binder (7-15%) with antioxidant (0.15 to 1.0% of polymer), plasticizer (0-4%), burn rate catalyst (0.05-6%), and quick cure catalyst system of about 0.02% maleic acid (MA) or maleic anhydride (MAN) and 0.02% triphenyl bismuthine (TPB).

The unexpected increase in pot life of m-TMXDI cured propellants as compared with the commonly used curing agent isophorone diisocyanate (IPDI) with less sensitivity to temperature change makes m-TMXDI a preferred curing and crosslinking agent for composite rocket propellant. Additionally, mechanical properties measured at −40° C., 25° C., and 60° C. are equal to or superior for those values of stress (psi), strain (maximum/break), and modulus measured for IPDI cured composite propellant composition as control.

4 Claims, 2 Drawing Sheets

TMXDI, CURING AGENT FOR HYDROXY TERMINATED PROPELLANT BINDERS

DEDICATORY CLAUSE

The invention described herein may be manufactured, used, and licensed by or for the Government for governmental purposes without the payment to me of any royalties thereon.

BACKGROUND OF THE INVENTION

At present isophorone diisocyanate, IPDI, is the commonly used isocyanate curative for hydroxyterminated polymers used in the rocket propellant industry. An alternate curing agent that has the desirable properties of IPDI has been sought because IPDI is foreign made. IPDI cannot at this time be produced in this country because of international patent rights and environmental constraints; therefore; in case of national crisis, it might become unavailable.

As noted hereinabove, isophorone diisocyanate, IPDI, has environmental constraints against being produced in this country since it is made by a phosgenation process. Although the current supply at the price from the foreign source, (e.g., of about $3.00 per pound), is a preferred price to that which could be met, if it could be produced in this country, with all things considered, it is prudent in case of national crisis to not be restricted to a foreign source which might become unavailable.

An alternate curing agent meta-tetramethylxylene diisocyanate (m-TMXDI) would offer advantages which the presently used IPDI could not meet in this country. The domestically produced m-TMXDI is made by a non-phosgenation process developed by American Cyanamid Company's research laboratories. The applications of m-TMXDI and p-TMXDI in reaction injection molding (RIM) permits the manufacture of urethane parts which require no post-painting. The isomers of either TMXDI which are naturally white (or can be pigmented any desired color) are light stable; and if scratched or damaged in use, they retain their integral color. The introduction of a new family of aliphatic diisocyanates to the polyurethane industry provides the products which motivates further research in another industry, i.e., the propulsion industry, to meet a current need.

Composite rocket propellants that are cured and crosslinked with a domestically produced acceptable substitute for IPDI is presently needed. An acceptable substitute for crosslinking hydroxyterminated polymers of polybutadiene binders employed in composite rocket propellants would be highly desirable if, additionally, improved propellant properties are derived from its use.

SUMMARY OF THE INVENTION

Meta-tetramethylxylene diisocyanate, (m-TMXDI), is employed as a curing agent (crosslinker) for hydroxyterminated polymers used in the production of composite rocket propellants. The curing agent, m-TMXDI, is employed in an amount from about 0.5 to about 2.0 weight percent of a composite propellant composition which comprises in weight percents of other ingredients of a high solids loading of aluminum metal fuel (0-20%) and ammonium perchlorate oxidizer (65-88%), hydroxy-terminated polymer binder (7-15%) with antioxidant (0.15 to 1.0% of polymer), plasticizer (0-4%), burn rate catalyst (.0.05-6.0%), and quick cure catalyst system of about 0.02% maleic acid (MA) or maleic anhydride (MAN) or oxalic acid and 0.02% triphenyl bismuthine (TPB). The evaluation of m-TMXDI in a propellant composition included comparing its effectiveness with the proven diisocyanate curing agent, isophorone diisocyanate (IPDI) which is foreign produced using a phosgenation process that has environmental constraints in this country. TMXDI, which is made by a non-phosgenation process in this country, shows lower propellant viscosities during processing, longer pot life, and less sensitivity to temperature change than the IPDI cured propellant.

DESCRIPTION OF THE PREFERRED EMBODIMENT

Figure 1:
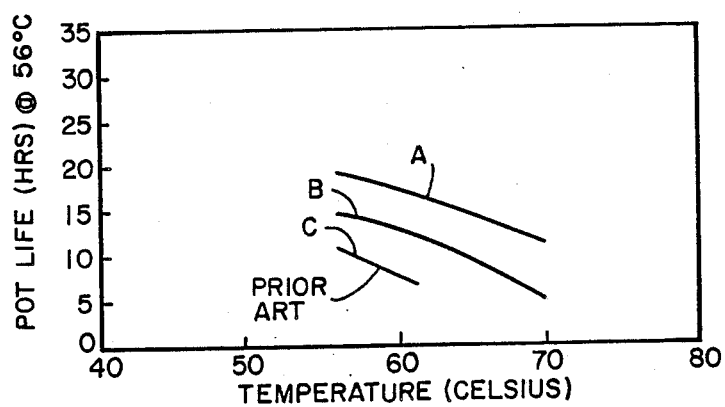
FIG. 1 compares pot life hours at 56° C. and effect of increased temperatures on pot life for TMXDI cured propellant and IPDI (prior art) cured propellant.

Composite rocket propellant compositions containing hydroxy-terminated polymers are cured with m-tetramethylxylene diisocyanate (m-TMXDI). These propellant compositions contain about 88 weight percent solids composed of ammonium perchlorate and aluminum; thus, processing conditions, mechanical properties, and pot life are elements of high consideration and importance in the solid propellant industry. The curing agent, m-TMXDI, in a range from about 0.5 to 2.0 weight percent, is employed in a composite propellant composition comprising a high solids loading of aluminum metal fuel (0-20%) and ammonium perchlorate oxidizer (65-88%), hydroxyterminated polymer binder (7-15%) with antioxidant (0.15 to 1.0% of polymer), plasticizer (0-4%), burn rate catalyst (0.05-6.0%), and quick cure catalyst system of about 0.02% maleic acid (MA) or maleic anhydride (MAN) or oxalic acid and 0.02% triphenyl bismuthine (TPB).

Prior to teaching the use of m-TMXDI and disclosing the data obtained from its use as a curing agent for high solids loaded composite propellants, the physical properties and structural formula is of interest. The paper titled: "m- and p-TMXDI: Two New Isocyanates For the Polyurethane Industry" by Volker D. Arendt, Raymond E. Logan, and Robert Saxon, which was presented at the Society of the Plastics Industry, Inc. (SPI) Fall Conference, Oct. 20-22, 1982, discloses the physical properties and identities for m-TMXDI and p-TMXDI as follows:

| PHYSICAL PROPERTIES AND IDENTITIES | | |
|---|---|---|
| Composition | m-TMXDI | p-TMXDI |
| CAS Registry NO. | 2778-42-9 | 2778-41-8 |
| Empirical formula | $C_{14}H_{16}N_2O_2$ | $C_{14}H_{16}N_2O_2$ |
| Molecular Weight | 244.3 | 244.3 |
| NCO Content % by weight | 34.4 | 34.4 |
| NCO Equivalent Weight | 122.1 | 122.1 |
| Physical form | colorless mobile liquid | white crystals |
| Melting point, °C. | −10° | 72° |

PHYSICAL PROPERTIES AND IDENTITIES -continued

| Composition | m-TMXDI | p-TMXDI |
|---|---|---|
| Boiling point, °C. | 150°/3 mm | 150°/3 mm |
| Vapor pressure, mm Hg 100° C. | 0.5 | 0.4 |
| Viscosity, cp | | |
| 0° C. | 25 | — |
| 20° C. | 9 | — |
| 80° C. | — | 8 |
| Flash point (closed cup) | | |
| °C. | >93° | >93° |
| °F. | >200° | >200° |
| Autoignition point, °C. | 450° | 450° |
| Pounds per gallon, approx. | 8.8 | 9.1 (melt) |
| Solubility | Both compounds soluble in almost all inert organic solvents (esters, ketones, esters, aromatic hydrocarbons). Partially soluble in aliphatic hydrocarbons. | |

The structural formula of m- and p-TMXDI (meta and para Tetramethyl Xylene Diisocyanate) are disclosed as follows:

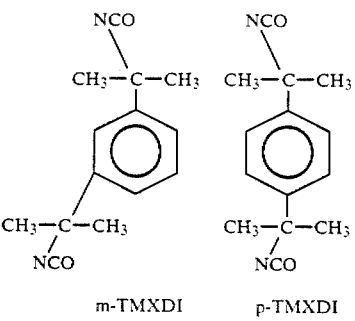

m-TMXDI    p-TMXDI

Since IPDI is the commonly used isocyanate curative for hydroxy-terminated polymers used in the rocket propellant industry, compositions for control purposes employed IPDI, and the experimental composition in a like formulation except m-TMXDI is employed as the curative. A first requirement for a solid propellant composition is the processing parameters relating to viscosity and fluidity. The meta compound and the para compounds of TMXDI are structural isomers having the same molecular weights and same isocyanate (NCO) contents; however, the meta compound is liquid at room temperature while the para compound is a solid, melting at 72° C. Thus, the m-TMXDI is the preferred isomer where a lower processing viscosity is required. Table I below compares end of mix viscosity data for composite propellant mixes, Control and Experimental, identified therein.

TABLE I

| CURING AGENT AND END OF MIX VISCOSITIES | | |
|---|---|---|
| POLYMER CURED AS BINDER | CONTROL | EXPERIMENTAL |
|  | IPDI CURED | m-TMXDI CURED |
| R45M* | 8.3 kp | 6.4 kp |
| R45HT** | 2.4 kp | 1.5 kp |

*Batch produced hydroxy-terminated polybutadiene.
**Continuous produced hydroxy-terminated polybutadiene.

Table II set forth the mechanical properties of an IPDI AND a m-TMXDI cured propellant composition at −40° C., 25° C., and 60° C. Each propellant used 0.02% TPB alone as a cure catalyst.

TABLE II

Mechanical properties of IPDI and m-TMXDI Propellants

|  | CURING AGENT | CONTROL IPDI | EXPERIMENTAL TMXDI |
|---|---|---|---|
|  | Weight % | 0.70% | 0.82% |
| 60° C. | STRESS, psi | 76 | 78 |
|  | STRAIN, max/break | 37.5/38.6 | 36.8/38.2 |
|  | MODULUS | 412 | 449 |
| 25° C. | STRESS, psi | 113 | 108 |
|  | STRAIN, max/break | 38.9/40.6 | 39.8/42.8 |
|  | MODULUS | 575 | 646 |
| −40° C. | STRESS, psi | 307 | 312 |
|  | STRAIN, max/break | 41.1/47.4 | 42.7/49.5 |
|  | MODULUS | 5407 | 6046 |

Table III sets forth the mechanical properties of an IPDI and a m-TMXDI cured propellant composition at −40° C., 25° C., 60° C. which also contains 0.02% each TPB and MA.

TABLE III

Mechanical Properties of IPDI And TMXDI Cured Propellants Containing 0.02% Each TPB And MA

|  | CURING AGENT | IPDI, 0.70% | m-TMXDI 0.82% |
|---|---|---|---|
| 60° C. | STRESS, psi | 99 | 94 |
|  | STRAIN, max/break | 30.6/31.1 | 32.3/4.1 |
|  | MODULUS | 594 | 500 |
| 25° C. | STRESS, psi | 125 | 118 |
|  | STRAIN, max/break | 32.1/32.9 | 34.6/35.8 |
|  | MODULUS | 675 | 631 |
| −40° C. | STRESS, psi | 329 | 344 |
|  | STRAIN, max/break | 40.6/48.6 | 43.2/47.1 |
|  | MODULUS | 5630 | 5075 |

Table IV Sets forth the mechanical properties of a IPDI and a m-TMXDI cured propellant composition at 25° C. which also contains 0.02% each TPB and MAN.

TABLE IV

Mechanical Properties of IPDI and m-TMXDI Propellants Containing 0.02% Each TPB And MAN

|  | CURING AGENT | IPDI | m-TMXDI |
|---|---|---|---|
|  | WEIGHT % | 0.70% | 0.82% |
| 25° C. | STRESS, psi | 111 | 122 |
|  | STRAIN, max/break | 40.6/42.3 | 35.4/37.1 |
|  | MODULUS | 608 | 670 |

Table V sets forth the mechanical properties of various size batches of IPDI and m-TMXDI cured propellant compositions measured at −40° C., 25° C., and 60° C. wherein amounts of IPDI and m-TMXDI are 0.67%, 0.77% and 0.78%, respectively.

TABLE V

Mechanical Properties of IPDI And m-TMXDI
Propellants Containing 0.025% TPB And MAN

| | | PROPELLANT BATCH SIZE | | | |
|---|---|---|---|---|---|
| | | PINT | PINT | GALLON | GALLON |
| | | CURING AGENT: | | | |
| | | IPDI | m-TMXDI | IPDI | m-TMDI |
| | WEIGHT % | 0.67% | 0.78% | 0.67% | 0.77% |
| 60° C. | STRESS, psi | 86 | 93 | 82 | 72 |
| | STRAIN, max/break | 36.1/39.0 | 35.1/37.8 | 37.5/39.0 | 43.5/48.1 |
| | MODULUS | 481 | 536 | 466 | 362 |
| 25° C. | STRESS, psi | 113 | 121 | 120 | 96 |
| | STRAIN, max/break | 34.4/37.8 | 37.8/42.5 | 36.0/40.9 | 44.2/49.8 |
| | MODULUS | 609 | 669 | 670 | 483 |
| −40° C. | STRESS, psi | 309 | 327 | 300 | 263 |
| | STRAIN, max/break | 45.2/56.8 | 41.4/55.9 | 44.7/52.0 | 52.1/69.6 |
| | MODULUS | 6292 | 6999 | 6424 | 6205 |

Table VI sets forth pot life of IPDI and a m-TMXDI cured propellant compositions which contained TPB, MA and MAN as a catalyst for quick curing formulation containing about 0.77 weight percent m-TMXDI.

TABLE VI

Pot Life: IPDI and m-TMXDI Propellants

| | Curing Agent | | | INCREASE IN POT LIFE WITH |
|---|---|---|---|---|
| % TPB | MA/MAN | IDPT | m-TMXDI | m-TMXDI |
| 0.02% | — | 11.4 hrs | 14.0 hrs | 33% |
| | MA, .02% | 11.2 | 21.0 | 50% |
| | MAN, 0.02% | 10.7 | 18.0 | 28% |
| 0.025% | MAN, 0.025% | 13.9 | 22.5 | 60% |

Table VII sets forth pot life comparison between a IPDI and a m-TMXDI cured propellant composition with burning rate catalysts of $Fe_2O_3$ and Catocene (2,2-bis(ethylferrocenyl)propane).

TABLE VII

Pot Life with Cure Catalyzing and Burning Rate Catalysts

| CURING AGENT BURNING RATE CATALYST | DDI | IPDI | m-TMXDI |
|---|---|---|---|
| $Fe_2O_3$ | 0.9 hr | 12.1 | 19.3 |
| Catocene | | 7.6 | 21.0 |

In further reference to the Figures of the drawing, FIG. 1 depicts Curves A, B, and C to show the effect of temperature increases on decreasing pot life for m-TMXDI cured propellant with 0.02 maleic acid, m-TMXDI cured propellant without maleic acid, and IPDI cured (prior art) propellant with 0.02% maleic acid respectively.

Figure 2:
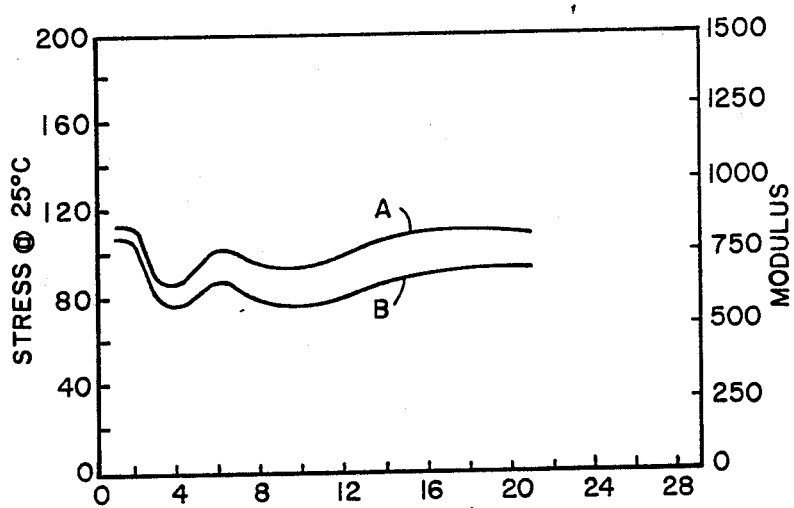
FIGS. 2 and 3 depict cure profiles for (prior art) IPDI propellants with TPB and TPB plus MA respectively.

FIG. 2 depicts a cue profile for IPDI cured (prior art) control propellant containing TPB wherein Curve A is stress and Curve B is modulus.

Figure 3:
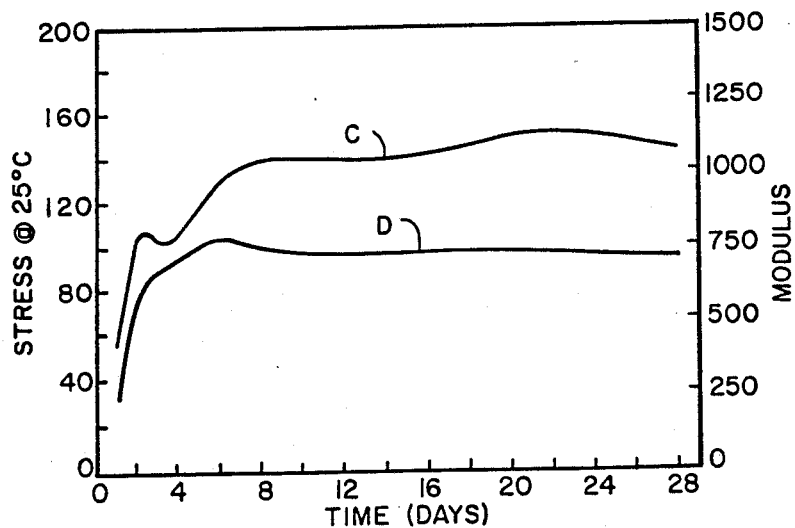

FIG. 3 depicts a cure profile for IPDI cured (prior art) control propellant containing TPB and MAN wherein Curve C is stress and Curve D is modulus.

Figure 4:
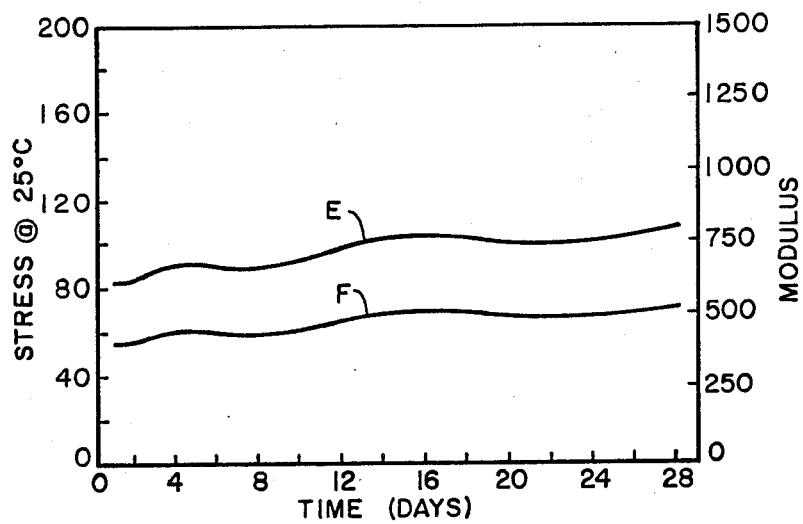
FIG. 4 depicts cure profile for TMXDI propellant with TPB.

FIG. 4 depicts a cure profile for m-TMXDI cured (experimental) propellant containing TPB wherein Curve E is stress and Curve F is modulus.

Figure 5:
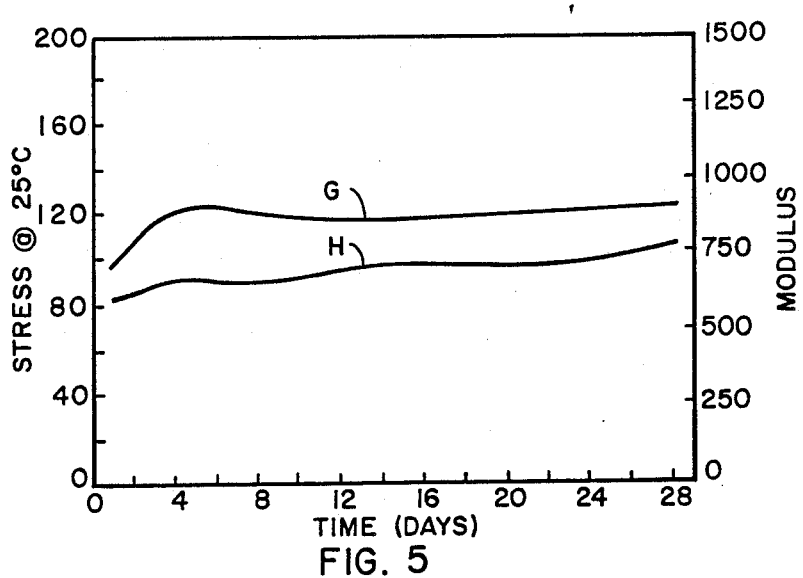
FIG. 5 depicts cure profile for TMXDI propellant with TPB plus MAN.

FIG. 5 depicts a cure profile for m-TMXDI cured (experimental) propellant containing TPB and MAN wherein Curve G is stress and Curve H is modulus.

Figure 6:
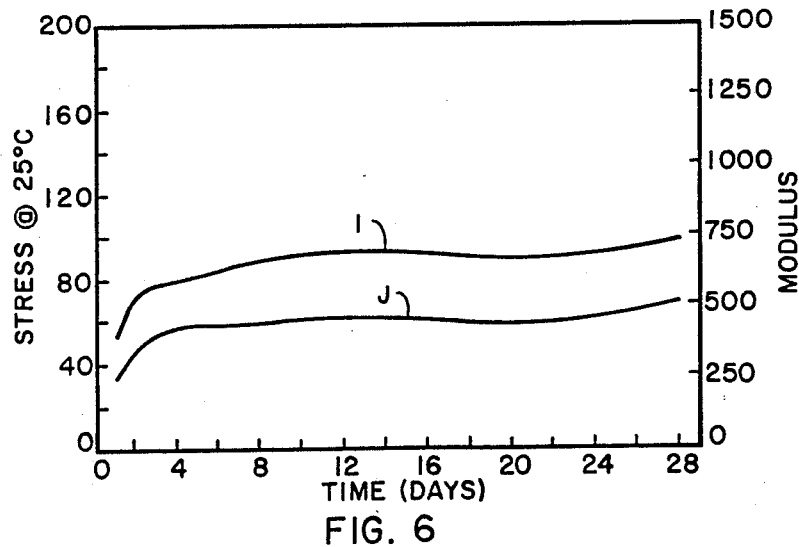
FIG. 6 depicts cure profile for TMXDI propellant with TPB plus MA.

FIG. 6 depicts a cure profile for m-TMXDI Cured (experimental) propellant containing TPB and MA wherein Curve I is stress and Curve J is modulus.

In conclusion, it is noted that in all cases mechanical properties are comparable for IPDI and m-TMXDI cured propellant. For examples, Table II shows mechanical data of IPDI AND m-TMXDI wherein 0.02% TPB is used as cure catalyst. Tables III and IV compare mechanical properties of IPDI and m-TMXDI propellants using 0.02% each TPB and MA, and 0.02% each TPB and MAN as cure catalyst, respectively. Table V shows mechanical properties of propellant from both gallon and pint mixes containing 0.025% each TPB and MAN. Thus, m-TMXDI meets the comparability tests for acceptability with IPDI since the stress, strain, and modulus are within desirable ranges for a composite solid propellant composition at the specified temperatures of measurement.

In the other areas of comparabilities for m-TMXDI with IPDI, m-TMXDI prevails in pot life, cure time equal or shorter, and pot life of high rate propellants containing cure catalyzing ingredients can be significantly extended by using m-TMXDI as the curing agent.

The above statement of conclusion for pot life has substantiating data in Table VI for increases in pot life with m-TMXDI ranging from 28% to 60% as compared with IPDI using same cure catalyst.

Pot life of m-TMXDI cured propellant is less sensitive to temperature change than IPDI cured propellant. See FIG. 1 for graphic illustration for m-TMXDI with and without 0.02% MA.

Table VII shows that substantially longer pot life can be obtained with m-TMXDI when cured catalyzing burning rate catalysts (e.g. $Fe_2O_3$ or Catocene) are present in the propellant.

In FIGS. 2 and 3, curing profiles are presented for IPDI with TPB and TPB and MAN respectively which represent control propellant or prior art. The improvements which are evident by uniform cure profiles for m-TMXDI with TPB alone, with m-TMXDI with TPB and MAN, and with m-TMXDI with TPB and MA are depicted in FIGS. 3, 4, and 5 respectively.

Cost comparisons based on total cost of propellant per pound using foreign country produced IPDI versus the cost of propellant per pound using domestically produced m-TMXDI indicate a price increase of only 0.3¢ (i.e, $0.003) per pound for the m-TMXDI cured propellant. Thus a propellant grain weighing a hundred pounds would cost only $0.30 more for the m-TMXDI cured propellant composition. The advantages of being able to use a domestically and commercially produced stock item (i.e., one which is used in quantity in polyurethane and reaction injection molding art) but has a specialized use as a curative for a propellant binder is readily recognized by an artisan in the propulsion industry and a procurement and a cost analyst as well.

The antioxidant class of compounds are added to rubber materials such as hydroxyterminated polymers to retard oxidation. Typical rubber antioxidants are commonly of an aromatic amine type, such as di-beta-naphthyl-para-phenylenediamine and phenyl-beta-naphthylamine. Other antioxidants are substituted phenolic compounds such as butylated hydroxyanisole, di-ter-butyl-para-cresol, and propyl gallate.

Burn rate catalysts can be selected from carboranes, ferrocenses, iron oxide, or combinations which contains the catalyst ingredient as part of the polymeric material, thereby preventing catalyst migration.

The adjustments of propellant ingredients by percent of the propellant formulation are made to obtain the desired properties of the finished propellant grain. For example, if the burn rate catalyst also functions as a binder the amount of the binder can be reduced. The use of plasticizers may also be considered for certain formulations of high solids content. Decreased pot life due to ionic metal catalysis such as induced by iron oxide or chelated metal compounds, can be offset by use of m-TMXDI as described hereinabove. In any event, the total propellant ingredients are adjusted to total 100 percent as determined by the above criteria and to meet the desired propellant mechanical properties, end of mix viscosities, and burning rates or chemical properties desired.

I claim:

1. A composite rocket propellant composition comprising a hydroxy-terminated polymer binder in an amount from about 7 to about 15 weight percent with an antioxidant in an amount from about 0.15 to about 1.0% weigh percent of polymer; ammonium perchlorate oxidizer in an amount from about 65 to about 88 weight percent; optional plasticizer from about 0 to about 4 weight percent; burn rate catalyst from abut 0.05 to about 6.0 weight percent; optional aluminum metal fuel from about 0 to about 20 weight percent; a quick cure catalyst system of about 0.02 weight percent maleic acid or maleic anhydride of about 0.02 weight percent and triphenyl bismuthine in an amount from about 0.015 weight percent to about 0.025 weight percent; and a curing agent and crosslinking agent of meta-tetramethylxylene diisocyanate (m-TMXDI) in an amount from about 0.5% to about 2.0% weight percent, said weight percent of m-TMXDI effective in extending pot life of said composite rocket propellant composition and achieving said pot life that is less sensitive to temperature change as compared with an isophorone diisocyanate (IPDI) cured composition rocket propellant composition.

2. The composite rocket propellant composition as defined in claim 1 wherein said m-TMXDI is present in an amount of about 0.82 weight percent; said quick cure catalyst system is maleic acid and said triphenyl bismuthine which is present in an amount of about 0.02 weight percent; and wherein said pot life is increased by about 50% as compared with an IPDI cured propellant composition.

3. The composite rocket propellant composition as defined in claim 1 wherein said m-TMXDI is present in an amount of about 0.82 weight percent; said quick cure catalyst system is maleic anhydride and said triphenyl bismuthine which is present in an amount of about 0.02 weight percent; and wherein said pot life is increased by about 28% as compared with an IPDI cured propellant composition.

4. The composition rocket propellant composition as defined in claim 1 wherein said m-TMXDI is present in an amount of about 0.77 weight percent; said triphenyl bismuthine which is present in an amount of about 0.025 weight percent; said quick cure catalyst system is maleic anhydride in an amount of about 0.025 weight percent and wherein said pot life is increased by about 60% as compared with an IPDI cured propellant composition.

* * * * *